US011841306B2

(12) United States Patent
Algre et al.

(10) Patent No.: US 11,841,306 B2
(45) Date of Patent: Dec. 12, 2023

(54) FINE PARTICLE SENSOR WITH CASCADED MICROSCALES

(71) Applicants: CENTRE SCIENTIFIQUE ET TECHNIQUE DU BATIMENT, Champs-sur-Marne (FR); UNIVERSITE GUSTAVE EIFFEL, Champs-sur-Marne (FR); UNIVERSITE PARIS EST CRETEIL VAL DE MARNE, Creteil (FR)

(72) Inventors: Emmanuelle Algre, Le Plessis Trevise (FR); Ugur Soysal, Noisiel (FR); Frederic Marty, Magny le Hongre (FR); Charles Motzkus, Ormesson sur Marne (FR); Enric Robine, Conches-sur-Gondoire (FR); Brice Berthelot, Champs-sur-Marne (FR); Evelyne Gehin, l'Hay les Roses (FR)

(73) Assignees: CENTRE SCIENTIFIQUE ET TECHNIQUE DU BATIMENT, Champs-sur-Marne (FR); UNIVERSITE GUSTAVE EIFFEL, Champs-sur-Marne (FR); UNIVERSITE PARIS EST CRETEIL VAL DE MARNE, Creteil (FR)

( * ) Notice: Subject to any disclaimer, the term of this patent is extended or adjusted under 35 U.S.C. 154(b) by 318 days.

(21) Appl. No.: 17/271,056

(22) PCT Filed: Aug. 30, 2019

(86) PCT No.: PCT/FR2019/052011
§ 371 (c)(1),
(2) Date: Feb. 24, 2021

(87) PCT Pub. No.: WO2020/044000
PCT Pub. Date: Mar. 5, 2020

(65) Prior Publication Data
US 2021/0255083 A1 Aug. 19, 2021

(30) Foreign Application Priority Data

Aug. 30, 2018 (FR) ..................................... 1857827

(51) Int. Cl.
*G01N 15/02* (2006.01)
*G01G 3/16* (2006.01)
(Continued)

(52) U.S. Cl.
CPC ........... *G01N 15/0255* (2013.01); *G01G 3/16* (2013.01); *G01N 1/2208* (2013.01); *G01N 5/00* (2013.01); *G01N 2015/0261* (2013.01)

(58) Field of Classification Search
CPC .... G01N 15/0255; G01N 1/2208; G01N 5/00; G01N 2015/0261; G01G 3/16
See application file for complete search history.

(56) References Cited

U.S. PATENT DOCUMENTS 3,653,253 A   4/1972  Olin
5,369,033 A   11/1994 Di Milia et al.
(Continued)

FOREIGN PATENT DOCUMENTS

EP    2 204 641 A1    7/2010

OTHER PUBLICATIONS

International Search Report dated Nov. 20, 2019 in PCT/FR2019/052011 filed on Aug. 30, 2019, 2 pages.
(Continued)

*Primary Examiner* — David Z Huang
(74) *Attorney, Agent, or Firm* — Oblon, McClelland, Maier & Neustadt, L.L.P.

(57) ABSTRACT

A sensor for the continuous in-situ analysis of an aerosol flow for measuring the mass of the micron/submicron particles suspended in the air flow, including an aeraulic sorter allowing the particles to be sorted according to their size
(Continued)

with an impactor body with a cascade of one or more stages; at least one MEMS microbalance per stage, with an oscillating silicon membrane located on the impaction zone of the particles; processor connected to each MEMS microbalance to determine the mass of all the particles on the impaction zone; a system for cleaning the MEMS microbalances allowing the evacuation of the particles from the MEMS microbalances; means for driving the aerosol flow.

22 Claims, 9 Drawing Sheets

(51) Int. Cl.
  *G01N 1/22* (2006.01)
  *G01N 5/00* (2006.01)

(56) References Cited

U.S. PATENT DOCUMENTS

| | | | |
|---|---|---|---|
| 10,203,272 B2* | 2/2019 | Wilson | G01H 11/08 |
| 2010/0170324 A1 | 7/2010 | Mastromatteo et al. | |

OTHER PUBLICATIONS

French Preliminary Search Report (with English translation of Categories of Cited Documents) dated Jul. 15, 2019 in French Application 1857827 filed on Aug. 30, 2018, 4 pages.

Maldonado-Garcia, M. et al., "Chip-Scale Implementation and Cascade Assembly of Particulate Matter Collectors With Embedded Resonany Mass Balances," IEEE Sensors Journal, vol. 17, No. 6, 2017, pp. 1617-1625, XP011641611.

Soysal, U. et al., "Aerosol mass concentration measurements: Recent advancements of real-time nano/micro systems," Journal of Aerosol Science, vol. 114, 2017, pp. 42-54, XP085242166.

Soysal, U. et al., "*Sub-µm air-gap resonant MEMS mass sensors fabrication and electrical characterization for the detection of airborne particles*," 2018 Symposium on Design, Test, Integration & Packaging of MEMS and MOEMS, 2018, 5 total pages, XP033363681.

* cited by examiner

Stage 17

Stage 16

Stage 13, 14, 15

FINE PARTICLE SENSOR WITH CASCADED MICROSCALES

FIELD OF THE INVENTION

The present invention relates to a sensor for measuring the mass concentration of fine particles for air pollution, potentially indoor air and contamination with a biological origin.

BACKGROUND OF THE INVENTION

Particulate pollution is implicated in the occurrence of various cardiovascular, cerebrovascular and respiratory pathologies through mechanisms of toxicity described by the "Haut Conseil de la Santé Publique" (HCSP) ("Pollution par les particules 2 dans l'air ambiant—Recommandations pour protéger la santé", 2012). Atmospheric pollution and particles in the air have been classified as "definitely carcinogenic to humans" in 2013 by the International Agency for Research on Cancer (IARC) ("Monographs on the evaluation of carcinogenic risks to humans"; volume 109). This pollution has also been identified as being responsible for premature deaths, of the order of 42,000 per year in France, which compliance with the thresholds recommended by the WHO (10 and 25 µg/m3 respectively annual average and 24-hour average for PM2.5 and 20 and 50 µg/m3 respectively annual average and 24-hour average for PM10) would make it possible to reduce significantly, as highlighted in the Aphekom report (InVS and other European partners, 2011).

Currently, the reference method for the measurement of PM10 and PM2.5 mass concentrations is the gravimetric method described in the European standard "EN 12341:2014 2016". This method of filter sampling followed by weighing under standard conditions is very cumbersome to implement and identified as "difficult to apply in the context of routine data production of measurement networks" by AIRPARIF in a summary report dated 2008 (AIRPARIF, 2008). The European standard allows the use of methods other than the gravimetric method provided that it can be proved that the measurement has a constant relationship with the reference measurements. This is generally referred to as certification via a "demonstration of equivalence to the reference method".

There are currently three methods of continuous PM10 and PM2.5 measurements used by monitoring networks in Europe: the Beta gauge, the TEOM (Tapered Element Oscillating Microbalance) and the TEOM-FDMS (Filter Dynamics Measurement System).

It can also be noted that there are optical methods of mass concentration measurement (nephelometry) which consist of measuring the intensity of light scattered by particles passing through a measuring cell illuminated by a light source. A calibration is used to determine the mass concentration. This method, which has the advantage of being miniaturizable and inexpensive, does not make it possible to define a stable correction factor with reference measurements, which makes it unsuitable according to the standards defined by the European standard.

In the literature, other systems are available for allowing a direct real-time measurement of the mass collected on the different stages of a cascade impactor. These systems called QCM (in English "Quartz Crystal Microbalance" or in French "Microbalance a quartz") allow to obtain the mass concentration of particles by size class corresponding to each stage of the impactor. These systems generally do not allow to obtain the total mass concentration but can however measure the mass concentration fractions such as PM10-2.5, PM2.5-1 or PM1-0.05 which can be interesting from an epidemiological point of view. It should be noted, however, that these devices are currently used very little as they have many metrological limitations (Berthelot, 2015).

From the previous elements it becomes very clear that there are currently no devices for real-time or low time step measurements, particulate mass concentrations meeting European requirements and of dimensions and operation suitable for multiple deployment in indoor or outdoor environments.

In this context, the invention concerns the development of a miniature system for the continuous monitoring of the particulate mass concentration for different particle size fractions (PM10-2.5, PM2.5-1 or PM1) of indoor or outdoor air.

SUMMARY OF THE INVENTION

The invention concerns a miniature system for the particle size analysis of particles, preferably polluting particles, suspended in the air. It comprises a miniature selection device using the aerodynamic properties of the particles as well as MEMS microbalances for mass measurement.

The present invention concerns a sensor for the in-situ and continuous analysis of an aerosol flow allowing the measurement of the mass of micronic/submicronic particles suspended in the air flow, comprising:
  a device of aeraulic sorting allowing to carry out the granulometry of the particles according to their size with an impactor body with a cascade of several stages, with along its length a flow pipe, each stage being formed of at least:
    an axial nozzle through which the flow enters the stage, and
    lateral openings;
  the diameter and the number of lateral and axial nozzle openings being chosen to allow the control of the aerosol flow rate and the sorting of the particles according to their inertia at each stage;
    at least one MEMS microbalance per stage, located at a distance from and facing the axial nozzle, on the impaction zone of the particles between lateral openings that allow the flow to pass through;
  the MEMS microbalance comprising a suspended oscillating silicon membrane for measuring an oscillation frequency shift to determine the mass less than or equal to one microgram of all the deposited particles;
    means for calculating connected to each MEMS microbalance to determine the mass of all particles on the impaction zone;
    a system for cleaning the MEMS microbalance allowing the evacuation of particles from the MEMS microbalance, the oscillating silicon membrane being shaped to control the adhesion and/or separation of particles on its surface;
    means for flowing the aerosol flow.
Preferably, the present invention concerns a sensor for the continuous in-situ analysis of an aerosol flow, allowing the continuous measurement of the mass concentration, preferably by size range, of micron or submicron particles suspended in the air flow, comprising:
  device of aeraulic sorting allowing to carry out the granulometry of the particles according to their size with an impactor body with a cascade of several stages, with a flow pipe along its length, and at the inlet of the aeraulic sorter a particle sampling head allowing only PM10 particles to pass through, each stage being made up of at least:

an axial nozzle through which the flow enters the stage, and lateral openings;

the diameter and number of lateral openings and of the axial nozzle being chosen to allow the control of the aerosol flow rate and the sorting of the particles according to their inertia at each stage;

at least one MEMS microbalance per stage, located at a distance from and facing the axial nozzle, whose active surface is located on the impaction zone of the particles between lateral openings that allow the flow to pass through;

to determine the mass less than or equal to one microgram efe of all deposited particles;

at least one axial recess located under each membrane in order to suspend it, the openings being lateral to the axial recess and intended for the flow of the aerosol flow and located on either side of the axial recess, means for calculating connected to each MEMS microbalance to determine the mass of all particles on the impaction zone;

a system for cleaning each MEMS microbalance, preferably at each stage, allowing the evacuation of the particles from the MEMS microbalance, means for flowing the aerosol flow, characterized in that each MEMS microbalance has as an active surface an oscillating silicon membrane with electrostatic actuation, said oscillating silicon membrane being:

of dimensions ranging in width from several hundred microns and several millimeters, alternatively said oscillating membrane is from one to several mm2, suspended from several silicon anchors to which it fixed in tension, arranged between several electrodes suitable for electrostatic actuation, conformed to have a quality factor Q greater than 15000, and a mass m between 5 and 100 μg, conformed to have membrane oscillation frequencies between 1 and 20 MHz, and preferably conformed to allow the adhesion and/or separation of particles, preferably according to their nature, to be controlled at its surface by micro/nano structuring or physico-chemical functionalization.

The invention makes it possible to develop high-performance sensors for the analysis of air quality due to particulate pollution in order to propose "alternatives" to current gravimetric systems whose sensitivity and portability are limited.

Indeed, the usual gravimetric sensors use the measurement of the resonance frequency of a mechanical oscillator. The resonance frequency is connected to its mass by $$f_r = \frac{1}{2\pi}\sqrt{\frac{k}{m}}$$

where fr is the resonant frequency, k the stiffness constant and m the mass of the oscillator. An addition of mass on the oscillator will thus cause a variation of its resonance frequency.

The minimum mass detectable by a resonator is given by:

$$\Delta m_{min} = \frac{m}{Q}$$

where Q is the quality factor. So a resonant element with a low mass and a high quality factor will have a higher detection sensitivity. By using silicon micro or nano-systems, the mass of the resonator can be considerably reduced.

The invention enables the development of MEMS devices for measuring "intermediate" masses of particles, i.e. between the attogram and the nanogram. In particular, the microbalance is designed to measure an oscillation frequency shift.

The reduced size and cost of the device allows its large-scale deployment and its adaptation to the monitoring of specific environments and/or the needs of the public. Due to these characteristics, the device can also be used as individual and/or nomadic equipment. This system can also be used to evaluate new practices and offers that will accompany the policies to improve the energy and environmental performance of buildings that are being put in place.

The device can be integrated into a network/connected object/instrument and/or a building air quality management device such as a ventilation system control device.

Depending on other optional sensor features:

the surface of the membrane is conformed to allow the adhesion and/or separation of particles to be controlled by:

micro/nano structuring physico-chemical functionalization;

controlling the adhesion of particles selectively according to their surface properties or the wetting of the cleaning fluid.

the system for cleaning is realized by inlet channels and lateral outlet channels opening into the flow pipe and means for circulating a cleaning fluid such as air or solvent in these channels, the inlet lateral channels and outlet lateral channels communicating fluidically with the flow pipe and being arranged so as to circulate the cleaning fluid over the surface of the membranes.

The membrane is suspended from several anchors to which it is fixed in a stretched position and arranged between several electrodes suitable for electrostatic actuation or measurement. Preferably, the oscillating membrane is able to deform in its plane in Lamé or extensional mode. More preferably, the oscillating membrane is able to deform only in its plane in Lamé or extensional mode. This is possible in particular thanks to the arrangement of the membrane described in the present invention.

means for flowing the aerosol flow are configured to allow a flow rate of one to several L/min, and wherein the axial nozzles at each stage have an opening of one to several hundred micrometers.

the oscillating silicon membrane has an electrostatically actuation, and wherein an alternating voltage combined with a direct voltage is applied to one or more actuating electrodes while the suspended membrane is maintained at zero electrostatic potential so as to deform the oscillating silicon membrane, the membrane being electrostatically charged, the movement of which induces a charging movement and thus a current measured via contacts connected to the anchors of the oscillating silicon membrane or connected to an electrode not used for actuation.

At least one layer of material is located on the surface of the MEMS microbalance membrane to allow preferential adhesion of target particles. In particular, the surface of the oscillating membrane is micro/nano-structured or functionalized physico-chemically, e.g. by black silicon.

The oscillating membrane has a surface area of one to several mm².

The surface of the membrane is black silicon. Advantageously, the black silicon has nanopillars, preferably sharpened, which reduce the rebound effect of the particles, thus providing a confined deposition pattern.

The surface of the membrane is covered with a thin layer of polymer.

Each stage has: at least one axial recess located under each membrane in order to suspend it, openings on either side of the axial recess for the circulation of the aerosol flow, and at each stage inlet, an axial nozzle for the circulation of the aerosol flow.

The impactor body has a stack of wafers of silicon or other micro/nano-structured materials, supported and fixed together.

Each stage has four wafers: a first wafer with an axial nozzle; a second wafer with an axial recess and lateral flow openings; two wafers being so-called "spacer" arranged between the first wafer and the second wafer.

The system for cleaning MEMS microbalance is realized by input channels and lateral output channels located between a so-called "spacer" wafer and the first silicon wafer.

the membrane of the MEMS microbalance is conformed to exhibit:
a quality factor Q, higher than 15000,
a mass m between 5 and 100 μg
the minimum mass detectable by the sensor being given by $$m_{min} = \frac{m}{Q}$$

The diameter and number of lateral openings and of each axial nozzle are chosen to allow the control of the aerosol flow rate and the sorting of PM10 particles according to their inertia at each stage in order to measure in particular a thoracic fraction of particles. PM10 particles are preferably of an average diameter of 300 nm to 10 μm.

The membrane oscillation frequencies are between 1 and 20 MHz. In particular, the membrane is arranged to allow membrane oscillation frequencies are between 1 and 20 MHz.

The system for cleaning MEMS microbalance includes an element for heating located in the membrane and/or the impactor body. Preferably, the system for cleaning MEMS microbalance comprises an element for heating located under the at least one membrane and/or in the impactor body, preferably at each stage.

The system for cleaning MEMS microbalance comprises the oscillating membrane designed to oscillate at a given frequency allowing the separation of particles from the membrane.

The impactor body has means for opening/closing: axial openings; and/or axial nozzles; to control the flow rate of the aerosol flow flowing into the impactor body.

The axial nozzles and the axial recesses are of decreasing size along the axis of the aerosol flow so as to impact particles of decreasing size at each stage.

the diameter and number of lateral openings allowing the flow is determined to impact: particles between 10 micrometers and 2.5 micrometers or more, at a first stage; and particles between 2.5 micrometers and one micrometer at a second stage; and particles between one micrometer and 0.3 micrometers at a third stage, depending on the direction of the aerosol flow.

The silicon flow pipe is coated with a conductive metal.

The dimensions of the oscillating membrane range in width from several hundred microns to several millimeters. In particular, the dimensions of the oscillating membrane range in width from microns to several millimeters.

For each MEMS microbalance, the distance between the oscillating membrane and electrostatic actuators is less than or equal to 1 micrometer.

oscillating membrane is a rectangular membrane. Preferably a rectangular or square membrane.

The MEMS microbalance is configured to allow the mass measurement of particles between the attogram and the nanogram.

One of the originalities of this device resides in the co-integration of the sorting system, microbalances manufactured using silicon microfabrication technologies and automated cleaning, reference or calibration functions. The functionalization of the surface of the microbalances by adequate treatment or microstructuring allows a preferential adhesion to measure the mass concentrations of contaminants to be monitored. This device is integrated on an electronic board in order to make the processing and control of the measurement signals compact. The integration of these functions allows the use of the instrument for continuous and real time monitoring of air quality.

BRIEF DESCRIPTION OF THE DRAWINGS

Other objectives, features and benefits will emerge from the detailed description that follows with reference to the drawings given for illustrative and non-limitative purposes, among which.

DETAILED DESCRIPTION OF ILLUSTRATIVE EMBODIMENTS

Figure 1:
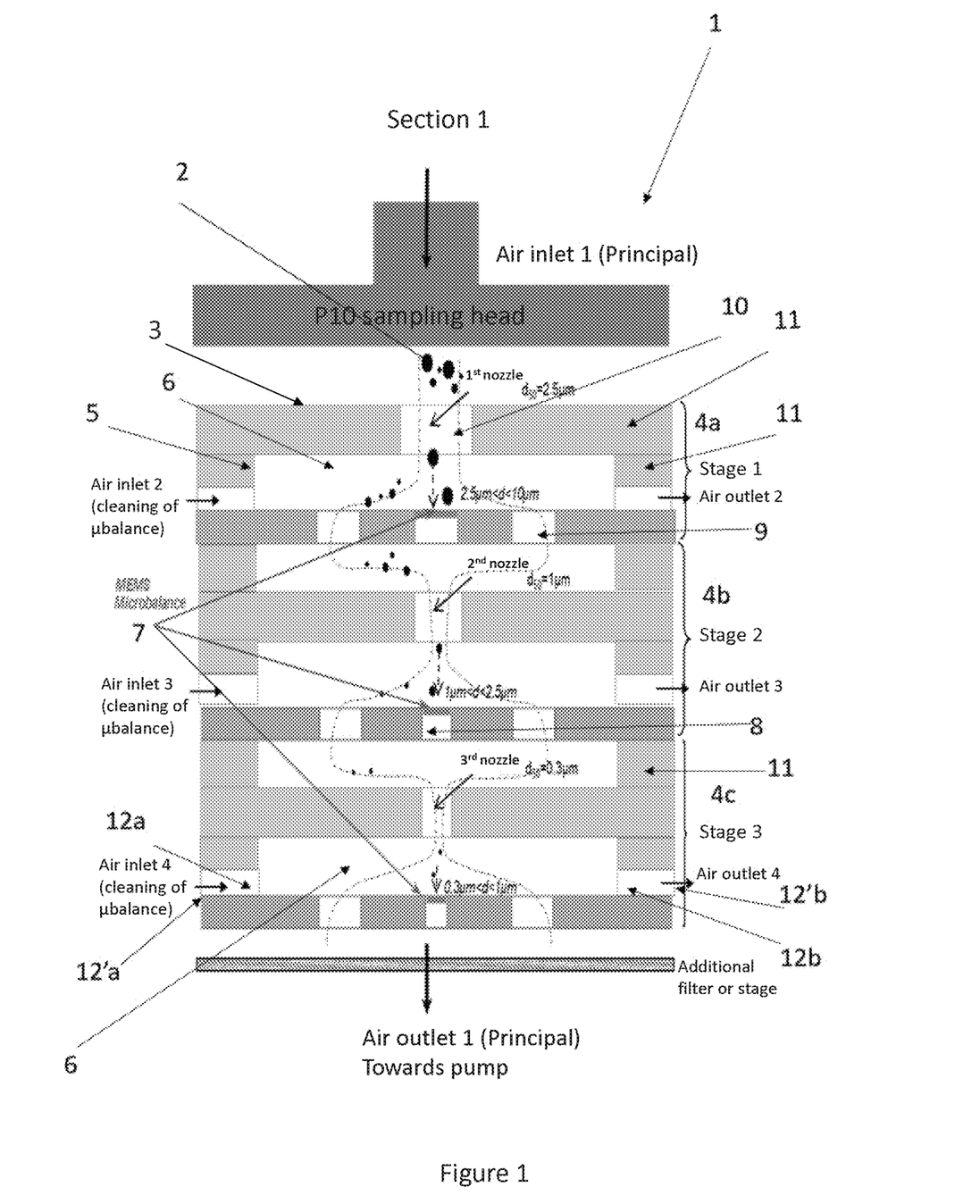
FIG. 1 represents a vertical sectional view along axis 1 shown in FIG. 3, of the device according to the invention.
Figure 2:
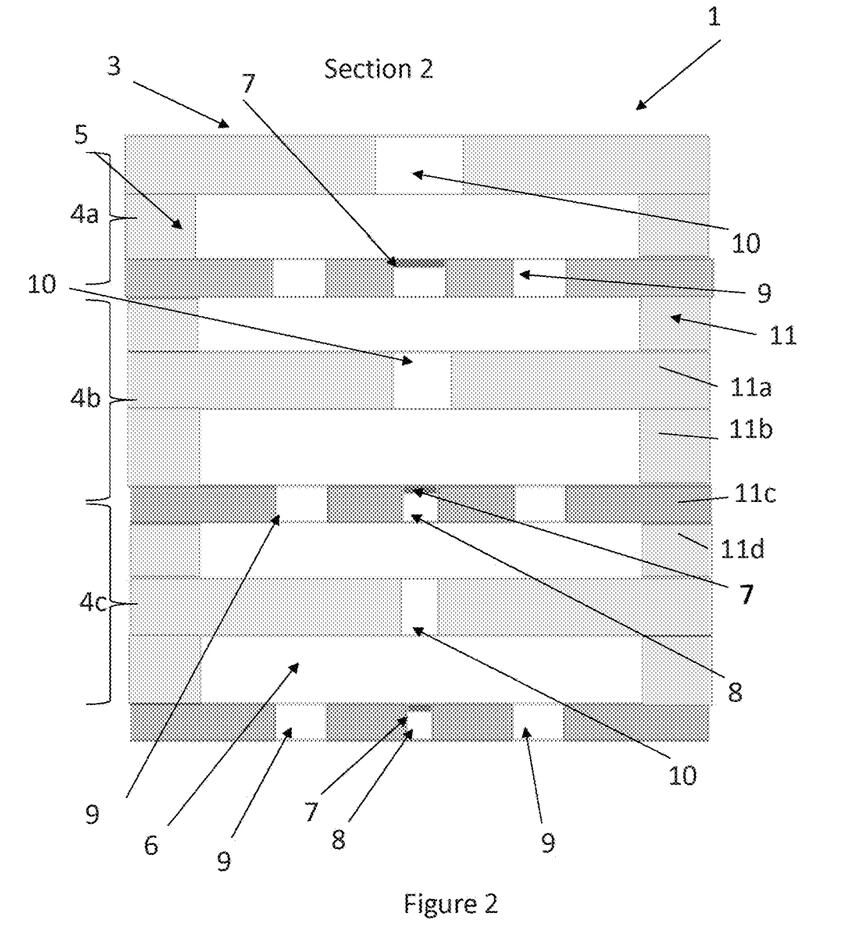
FIG. 2 represents a vertical view along axis 2 perpendicular to axis 1, of the device according to the invention.
Figure 3:
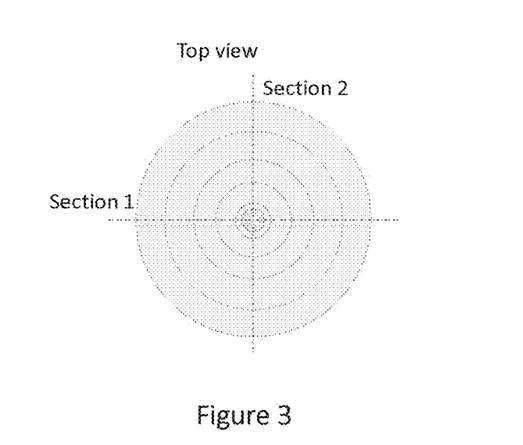
FIG. 3 represents a top view of the device according to the invention, with axes 1 and 2.

The present invention presents a sensor 1 for the continuous in-situ analysis of an aerosol flow, allowing the measurement of the mass of micron/submicron particles 2 suspended in the air flow and represented in FIGS. 1 to 3.

This sensor 1 includes a device of aeraulic sorting allowing to perform the granulometry of the particles 2 according to their size while integrating the measurement systems. The device of aeraulic sorting according to the present invention:
  an impactor body 3 with cascade of one or more stages 4a, 4b, 4c, presenting at the entry a sampling head of the particles (the size, more particularly the aerodynamic diameter which corresponds to the average diameter, of these particles being advantageously lower than 10 micrometers, that is to say particles called in the state of the art PM10), followed by a flow pipe 6 formed for each stage and following the direction of the aerosol flow: at least one axial nozzle 10, followed by lateral openings 9 at the axial nozzle to allow the flow of the aerosol flow; the diameter of the axial nozzles 10, advantageously from one to several hundred micrometers, being chosen to allow the control of the flow rate of the aerosol flow and the sorting of the particles 2 according to their inertia; the duct 6 is also formed of walls 5 extending in the length of the impactor body 3 between the axial nozzle 10 and the lateral openings 9.
Sensor 1 also has:
  at least one MEMS 7 microbalance per stage 4, with silicon oscillating membrane 7a with an actuator preferably electrostatically located in the impaction zone of the particles 2 facing an axial nozzle and between two or more lateral openings 9; this MEMS 7 microbalance is particularly designed to measure a shift, preferably of the order of a few tens of hertz, of the oscillation frequency in order to determine the mass less than or equal to one microgram of all the particles 2 deposited on the MEMS 7 microbalance;
  means for calculating connected to each MEMS 7 microbalance to determine the mass of all the particles 2 on the impaction zone, as a function of the offset between the oscillation frequency of the oscillating membrane 7a with particles 2 and the oscillation frequency of the membrane without particles 2;
  a system for cleaning MEMS microbalance allowing the evacuation of the particles 2 out of the MEMS microbalances;
  means for flowing aerosol flow.

The system for cleaning allows the sensor to operate in continuous/real time, the MEMS 7 microbalances being cleaned before any new measurement of sensor 1.

As an example only and in a non-limitative way, it can be chosen time steps of every hour, every quarter of an hour, every minute, every 10 seconds, to carry out the cleaning, thus allowing periodic measurements, real time or near real time measurements. This will typically depend on: the concentrations encountered; the use made of the system.

If the regeneration of a sensor is an identified problem is known, the difficulty is to integrate and operate it in situ without "maintenance" intervention on the sensor and without damaging it. It is described in the state of the art the use of a supercritical fluid which is inapplicable without maintenance on the sensor and therefore for the present integrated system of the invention.

The solution we propose is easy to implement and can be combined with a mechanical action (by vibrating the membrane vertically or horizontally at a frequency higher than the particle detachment frequency) or with a thermal action (by integrating resistive elements under the membrane).

The schematic diagram of the system is shown in FIGS. 1, 2 and 3.

The sampling head (filter with opening, vortex or other state of the art system) allows only PM10 particles to pass through, i.e. particles whose size, in particular the diameter, is less than 10 micrometers (PM10). A description and measurement of PM10 particles is in particular detailed in standard NF EN 12341.

The diameter of the axial nozzles at each sampling stage can be of the order of a few hundred micrometers with flow rates from 1 to several L/min. Thus, this flow rate corresponds roughly to the human ventilatory flow rate, which is between 5 and 10 L/min, whereas flow rates<0.3 L/min such as those of the system described by Maldona-Garcia et al, 2017—IEEE SENSORS JOURNAL, Vol. 17, No. 6, Mar. 15, 2017 are not very representative. Moreover, this corresponds to cut-off diameters between 100 nm and a few µm (e.g. 10 µm) in order to measure particles with an average diameter smaller than 10 micrometers. For example to measure particles from a few 100 nm to 10 µm, preferably PM10 particles with a diameter of at least 100 nm, more preferably at least 200 nm.

The aim is to provide a device compatible with the WHO standards concerning the categories of particles (PM) to be measured and their threshold values. In particular, this device allows the measurement of the thoracic fraction of particles.

Using the cascade impactor, particles 2 of different diameters are impacted at different stages 4a, 4b, 4c of the system and measured using MEMS 7 microbalance located at the impaction zones.

Indeed, depending on the opening diameter of an impactor, the air flow loaded with particles will be more or less accelerated, the particles 2 of lower inertia will follow the air flow while those of higher inertia will be impacted on a zone located under an aerosol flow nozzle located opposite the MEMS 7 microbalance.

Each stage 4a, 4b, 4c presents on the same plan:
  at least one axial recess 8 through or not through (for example a notch in the silicon wafer) located under each microbalance to suspend the membrane 7a, and
  lateral openings 9 for the aerosol flow located on both sides of the axial recess 8, and at each stage entrance an axial nozzle 10 located under the axial recess 8.

Advantageously, the lateral openings 9 are arranged symmetrically to the axial recess 8 located centrally in the impactor body 3.

Axial nozzles 10 and axial recesses 8 are of decreasing size along the axis of the aerosol flow so as to impact particles 2 of decreasing size at each stage.

Here, it can be chosen for example a diameter and a number of lateral openings 9 located in the flow passage to allow impact:
  particles 2 between 10 micrometers and 2.5 micrometers at a first stage; and particles 2 between 2.5 micrometers and one micrometer, at a second stage; and particles 2 between 1 micrometer and 0.3 micrometer at a third stage, depending on the direction of the aerosol flow.

The impactor body 3 can have a modular stack consisting of wafers 11 of silicon or other micro/nano-structured materials, for example by means of micro or nano manufacturing in clean rooms, supported and attached to each other.

For example, other possible materials are: glass, aluminum.

If flow pipe 6 is made of silicon or other micro/nano structured material, it can be covered with a conductive metal.

Here in FIG. 2, each stage 4a, 4b, 4c shows four wafers 11:
a first wafer 11a with an axial nozzle 10;
a second wafer 11c with an axial recess 8 and lateral openings 9 for the flow of the aerosol flow along the impactor body, this flow being axial through the axial nozzle 10 and stretching radially to reach the lateral openings 9 after exiting the axial nozzle 10;
two wafers 11b, 11 d so-called "spacers" arranged between the first wafer 11a and the second wafer 11c.

Here on FIG. 1, the system for cleaning MEMS microbalance is realized by lateral inlet channels 12a and lateral outlet channels 12b in the interleaved silicon wafers and opening into flow pipe 6 by lateral air inlets 12'a and 12'b, and means for circulating a fluid such as air in these channels 12a and 12b.

The inlet lateral channels 12a and outlet lateral channels 12b fluidically communicate with the flow pipe 6 to circulate a cleaning fluid, such as air or solvent or solvent+air, over the MEMS microbalances from the inlet lateral channels 12a to the outlet lateral channels 12b.

They lead to the flat surface of stage 4a, 4b, 4c, which has the axial openings 9 and the MEMS microbalances 7.

The input lateral channels 12a and output lateral channels 12b of each stage 4a, 4b, 4c are located between a silicon wafer called "spacer" 11b, 11d and the first silicon wafer 11a.

As an alternative, not shown in FIG. 2, the system for cleaning MEMS microbalance includes an element for heating.

In a second variant, the system for cleaning MEMS microbalance includes the oscillating membrane 7a.

In a third variant, the system for cleaning has a combination of at least two of the following three devices:
lateral input channels 12a and lateral output channels 12b;
the element for heating located at the impaction zone
the oscillating membrane 7a; in this case the membrane 7a is driven by means for controlling to vibrate at a certain frequency in order to evacuate the particles at a desired period.

The means for controlling and flowing the aerosol flow are, for example, one or more pumps.

In a variant not shown in the diagrams, the impactor body 3 of the sensor 1 has means for opening/closing:
lateral openings 9 and possibly axial recesses 8 if they are continuous;
and/or axial nozzles 10.

The silicon membranes 7a, with an electrostatically actuation (FIG. 4) of the developed microbalances, are vibrated at their resonance according to a deformation mode with a high quality factor.

The actuation of membrane can also be: piezoelectric or magnetic.

Figure 4:
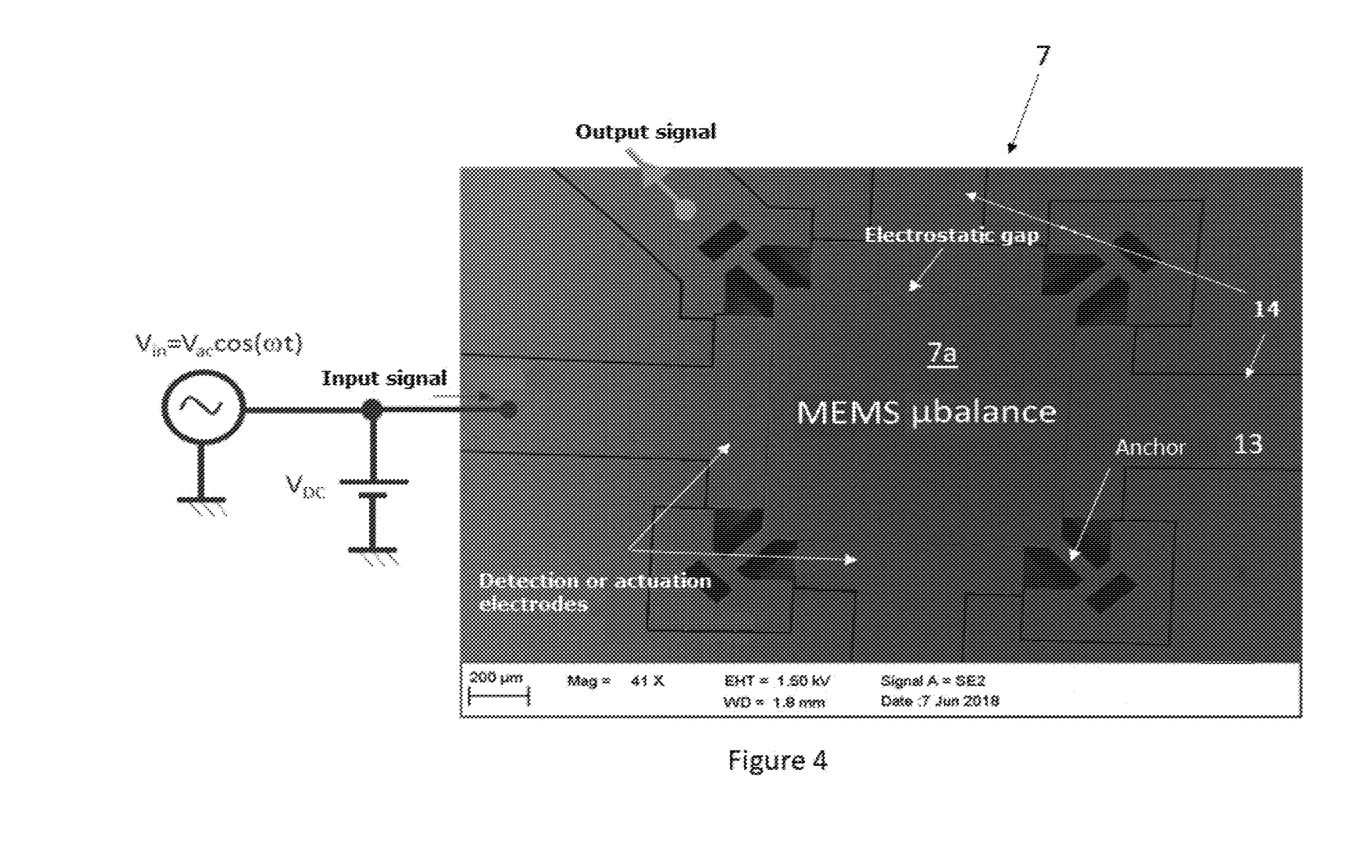
FIG. 4 represents a SEM image of a MEMS microbalance consisting of a silicon resonator with an electrostatically actuation and measuring principle with recovery of the output signal via a sectional anchor.

Each membrane 7a is suspended from several anchors 13, preferably made of silicon, to which the membrane is fixed in tension, the membrane 7a being arranged between several electrodes 14 suitable for electrostatic actuation or measurement. Advantageously, the membrane is surrounded on its circumference by the electrodes.

Here in FIG. 4, four electrodes 14 have been made, which can be made of doped silicon, supplied with an input signal and receiving an output signal.

In the case where the actuation is electrostatic, an alternating voltage combined with a direct voltage is applied to one or more actuation electrodes 14 while the suspended membrane 7a is maintained at a zero electrostatic potential. An electrostatic force oscillating at the same frequency as the actuation voltage is thus induced on the membrane 7a.

The membrane 7a is then deformed in a planar oscillating movement. As membrane 7a is electrostatically charged, the movement of the membrane 7a induces a charging movement and thus a current proportional to the speed of movement of membrane 7a.

This current can be measured via contacts connected to the anchors 13 of membrane 7a or to an electrode not used for actuation. There are particular actuation frequencies for which the deformation amplitude of membrane 7a is maximum.

For a resonance frequency, the current measured at this frequency is maximum. With an addition of mass, this mechanical resonance frequency will vary.

The measurement of the resonance frequency therefore provides information about the deposited mass.

Advantageously, the surface of the MEMS 7a membranes of the MEMS 7 microbalances can be used to control the adhesion and/or separation (alternatively wetting/un-wetting of the cleaning fluid) of particles 2:
micro/nano structured and/or
functionalized
promoting the adhesion of particles 2 selectively according to their surface properties.

Eventually it can have electrostatic/mechanical or thermal properties to control the adhesion and/or separation of particles 2, when charged. For example a possibility if some aerosols are negatively charged and others rather positively charged, using electrostatic properties can also improve the deposition efficiency.

One or more layers of material can be placed on the surface of the 7a membranes of MEMS microbalances to allow preferential adhesion of target 2 particles.

Depending on the application, the surface of the 7a membranes is configured differently.

For example, the surface of the membranes 7a can be optimized to preferentially detect the mass of biological aerosols, pollens, fungi, bacteria thanks to their specific surface properties.

Figure 10A:
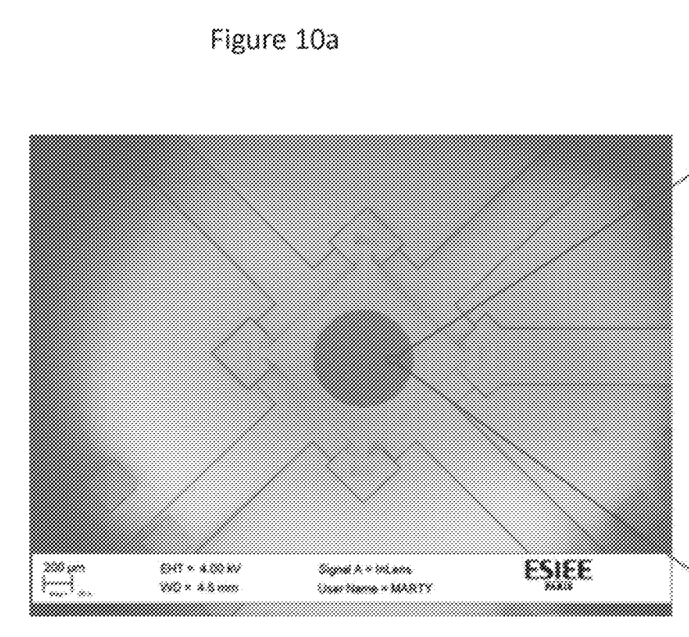
FIGS. 10a and 10b represent scanning electron microscopy images of a square membrane with a black silicon area in the center.
Figure 10B:
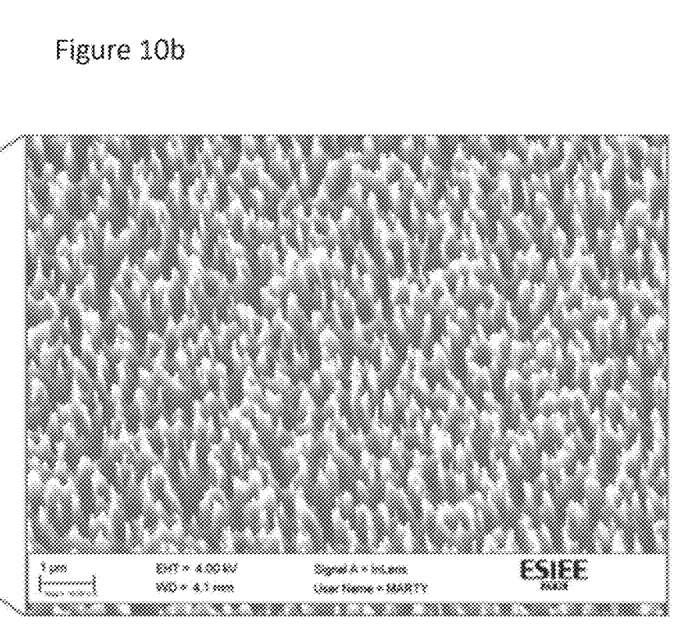

The surface of the membranes 7a of MEMS microbalances can be micro or nanostructured silicon, such as black silicon (shown in FIGS. 10a and 10b).

Advantageously, the surface of the membranes can be coated with a polymer. In one particular realization mode, the surface of the membrane 7a is black silicon coated with a thin layer of polymer to, for example, influence the adhesion of target particles 2 to the membrane 7a or the behavior of target particles 2 with respect to the 7a membrane.

The oscillating membrane 7a was realized as shown in FIG. 4.

The width of the oscillating membrane 7a range from several hundred microns to several millimeters. That means, at least 100 µm, or even 200 µm, 300 µm, 400 µm, preferably at least 500 µm. In addition, the oscillating membrane 7a can have a width of up to 10 millimeters, preferably up to 5 millimeters. Thickness dimensions can be between 30 µm and 50 µm or between 35 µm and 45 µm, for example.

For each MEMS 7 microbalance, the distance between the oscillating membrane 7a and the electrostatic actuators which are the electrodes is less than or equal to 1 micrometer.

The oscillating membrane 7a is preferably a rectangular or square membrane.

The oscillating membrane 7a is advantageously a rectangular membrane.

It can also have a circular shape or any other shape.

The oscillating membranes 7a of the MEMS 7 microbalances are conformed to present:
  a quality factor Q higher than 15000; this quality factor being obtained by using silicon, a well-chosen deformation mode of the microbalance, and a shape of the anchors 13; with $m_{min}$=m/Q where $m_{min}$ is the minimum detectable mass of the solid particles to be measured by the microbalance, and m is the mass of the membrane or active surface.

Masses m between 5 and 100 µg.

The frequencies of the membranes 7a of the MEMS microbalances are advantageously between 1 and 20 MHz.

Advantageously, the MEMS 7 microbalance is configured to allow the mass measurement of particles 2 between the attogram and the nanogram.

The resolution or accuracy of the MEMS 7 microbalance in mass measurement is the nanogram, due to the choices made to take silicon, with a specific deformation mode of the membrane 7a, and a particular shape of the 13 anchors, which allow to maximize the quality factor of the resonator while keeping a large active surface.

By the geometry of the microbalance (in particular square), its type of actuation (electrostatic) and its deformation mode (according to a volume mode in the plane) in Lamé or extensional mode, which makes it possible to guarantee high frequencies of use (of a few MHz) while maintaining a large active surface (of the order of mm$^2$). A large active surface can for example correspond to an active surface from 100 µm$^2$ to 10 mm$^2$, for example between 200 µm$^2$ and 9 mm$^2$, between 200 µm$^2$ and 6 mm$^2$, between 200 µm$^2$ and 4 mm$^2$, between 500 µm$^2$ and 2 mm$^2$).

The microbalance thus obtained shows a high-quality factor and thus a good sensitivity (about 50 Hz/ng) while being able to measure a large number of particles with a diameter ranging from 0.1 to 10 µm without saturation (corresponding to mass concentrations ranging from a few ng/m$^3$ to a few 10 µg/m$^3$).

Thus, the microbalance is particularly designed to measure an offset of only a few tens of Hertz around the mechanical oscillation frequency of one to several MHz of the membrane. More particularly, the mechanical oscillation frequency of the membrane is between 1 MHz and 20 MHz, even more particularly the mechanical oscillation frequency of the membrane is between 1 MHz and 20 MHz and the measurement of the offset is a few tens of Hertz around the mechanical oscillation frequency of the membrane 7a, for example about 50 Hz.

The deformation mode according to an in-plane volume mode means that the elastic deformations do not occur locally on the surface but are simultaneous throughout the entire thickness of the membrane 7a. Here the deformations are in-plane, i.e. the deformation is not vertical to the active surface but horizontal. Moreover, the electrostatic actuation allows the electrodes to be positioned not on the active surface of the MEMS membrane 7a, but outside it and act on the thickness of the active surface to deform it.

Thus, these electrodes on the outside alternately cause the membrane 7a to expand and contract in the horizontal directions of the active surface, the membrane with its active surface and thickness moving only in the horizontal directions of the active surface.

Thus, the MEMS membrane 7a is not actuated out of plane (in the direction of the thickness of the active surface).

The sensor 1 may have means for controlling and communicating (wired or radio), electronic or software, allowing the user to acquire, visualize, and exploit data, integrated or remote.

These means allow in particular the integration of the sensor 1 or of a system with a set of sensors 1 in a building air quality control system.

Figure 5:
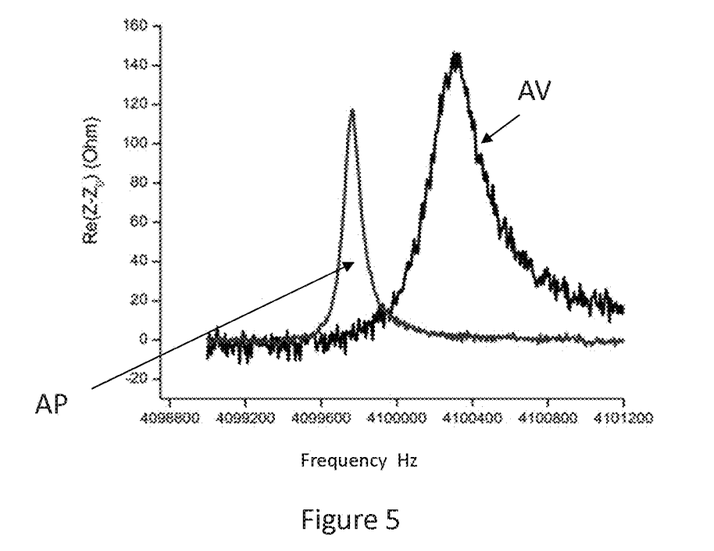
FIG. 5 shows the resonance curve of a microbalance before (AV curve) with a mean frequency of 4100297.7 Hz, and after (AP curve) aerosol impaction with a mean frequency of 4100222.5 Hz.

FIG. 5 shows the frequency shift of the oscillating membrane 7a following the deposition of 2 micron/submicron particles suspended in the airflow.

Figure 6:
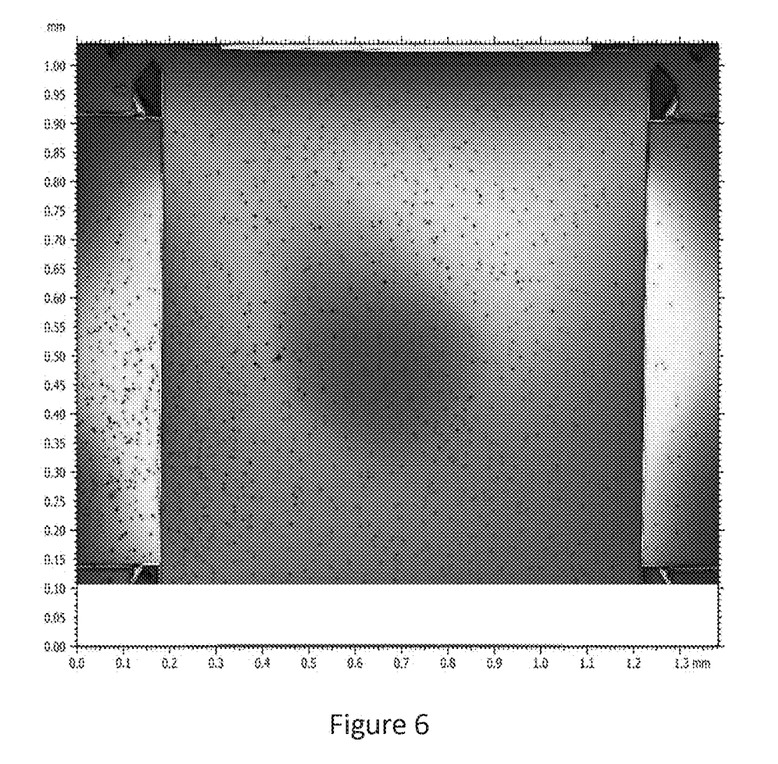
FIG. 6 shows a SEM image of a MEMS microbalance after aerosol deposition.

FIG. 6 shows the impact of the particles 2 on the membrane 7a.

Figure 7:
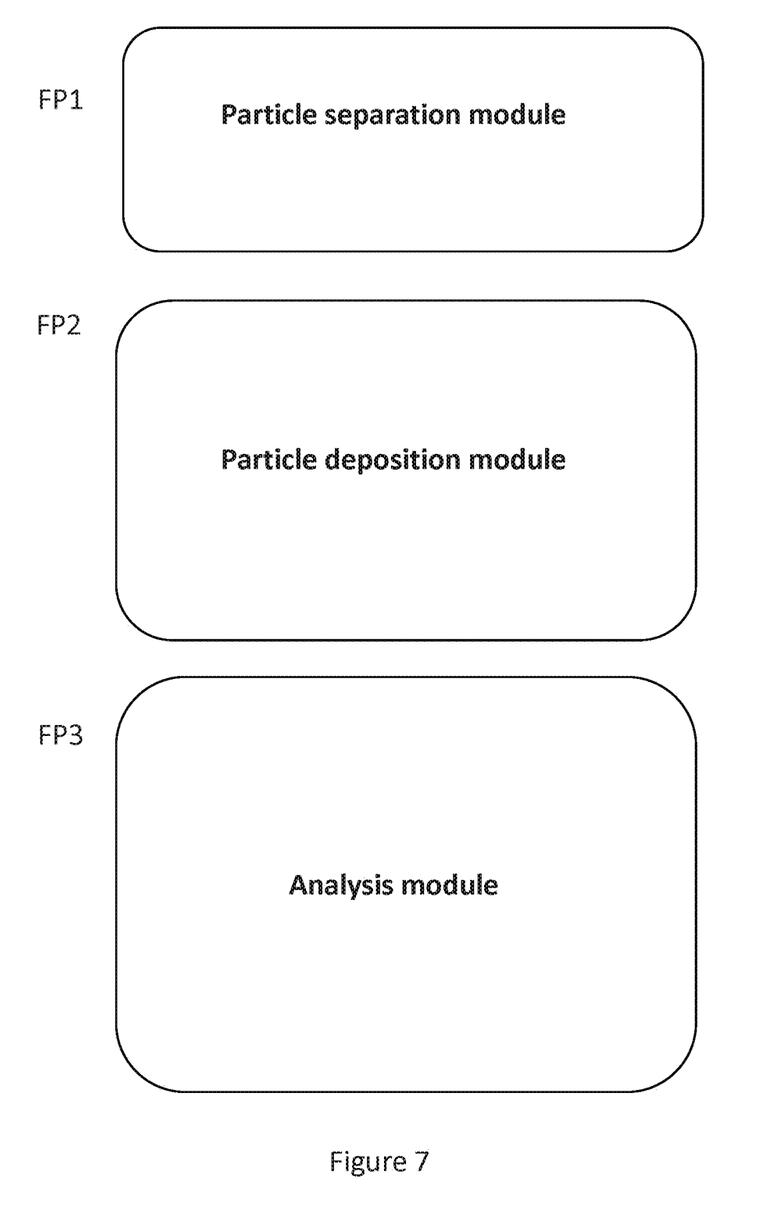
FIG. 7 represents the main functions of the device according to the invention.

FIG. 7 represents the main functions of the device according to the invention. Thus according to a method of realization the device includes a particle separation module FP1, a particle deposition module FP2, an analysis module FP3.

Advantageously, the FP1 separation module includes a selection head, for example a PM10 head. The particle separation module FP1 allows to sort the particles preferably according to their inertia, for example according to their size, and this on several impaction stages.

The particle deposition module FP2 allows particle adhesion. In addition, the particle deposition module is configured to target an area of interest on the MEMS sensor. Thus, the FP2 particle deposition module has a targeted area of interest on the MEMS sensor. In addition, the particle deposition module is configured for particle adhesion by functionalization and/or micro/nano structuring of the MEMS surface. Advantageously, the particle deposition module is configured for the regeneration of the sensor 1 including self-cleaning e.g. by air flow, vibration, temperature.

The FP3 analysis module can be configured to measure the resonance frequency of MEMS sensors before and after particle deposition.

The FP3 analysis module can also be configured to determine the mass of the particles 2 deposited on the MEMS as a function of the frequency shift. Advantageously, this FP3 analysis module allows automated signal processing. This analysis module also allows continuous in-situ analysis.

Figure 8:
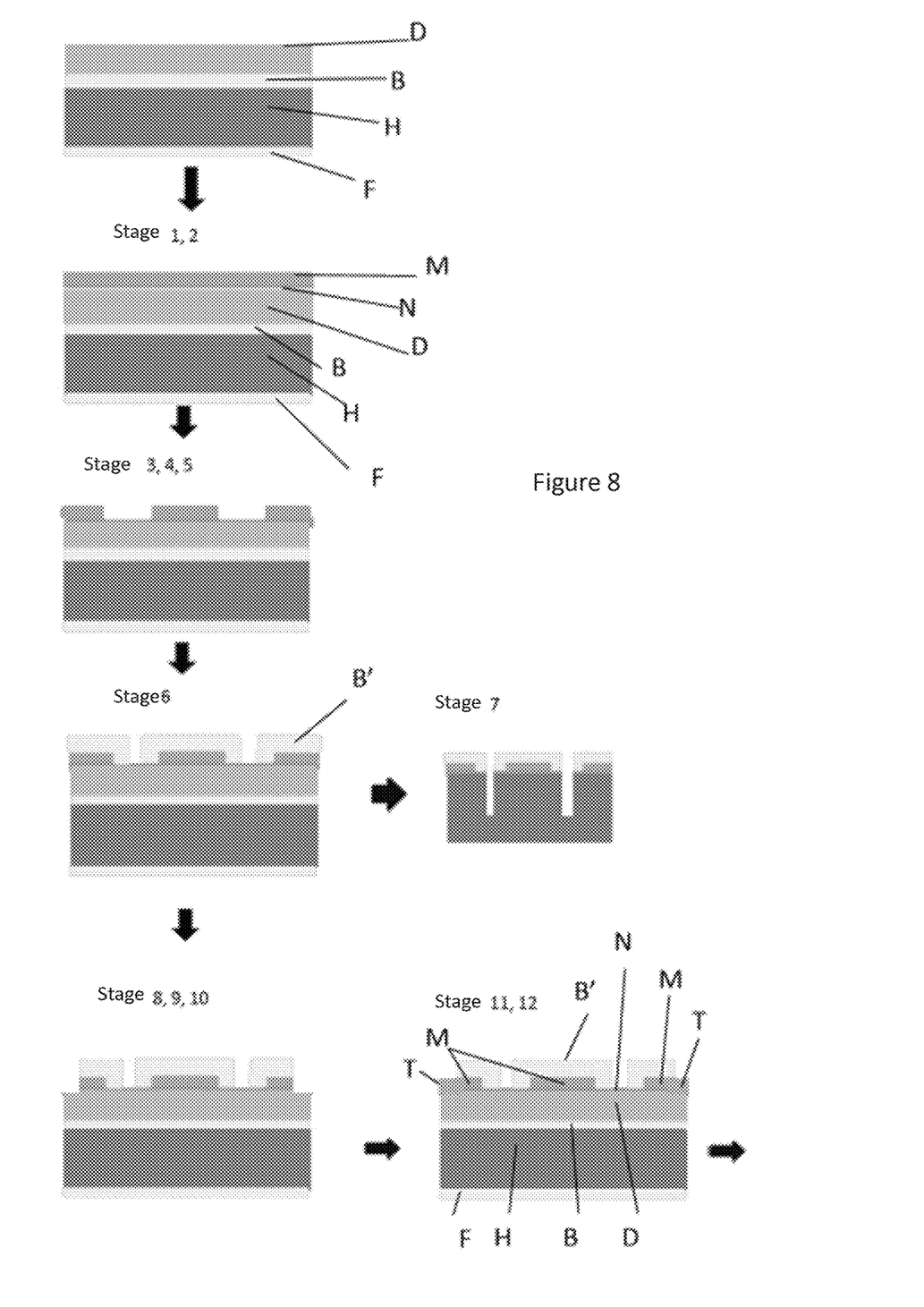
FIG. 8 shows the manufacturing process of a membrane used in the device; device.
Figure 9:
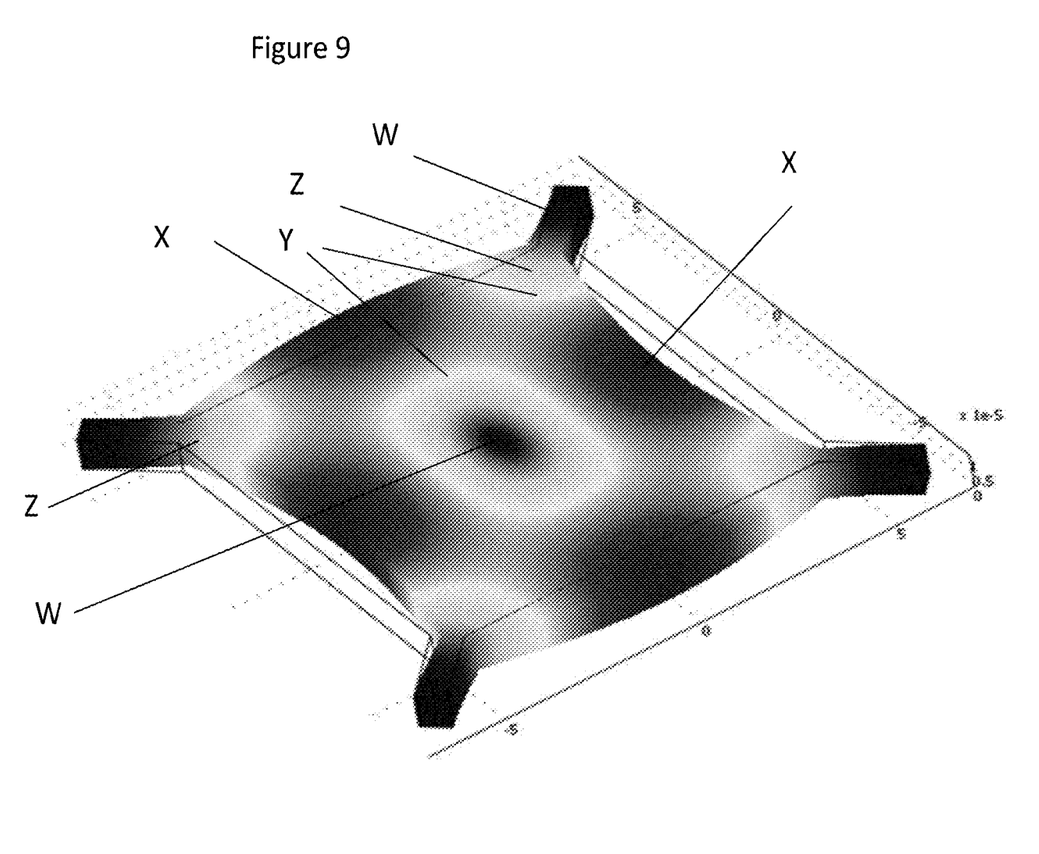
FIG. 9 represents a result of mechanical simulation by finite elements with the COMSOL @ software, showing the maximum deformation of a square membrane and its 4 suspension anchors for an oscillation frequency corresponding to the Lamé resonance frequency. The elastic deformations shown in the figure vary from 0 (for the W mark) to a few nanometers (for the X mark)

MEMS 7 microbalances are realized by microfabrication processes in clean room, whose steps are shown in FIG. 8.

As shown in FIG. 8, they are made from SOI (Silicon On Insulator) wafers with a stack of polished monocrystalline silicon several tens of micrometers thick, called "Device" and then "D", a layer of silicon oxide SiO2 called "Box", later "B" or "B'", a few micrometers thick, and a layer of polished monocrystalline silicon several hundred micrometers thick called "Handle", later "H", and an oxide backside, called F in FIG. 8, 2 micrometers thick.

The D layer is made of very low electrically resistive doped Silicon in order to guarantee the electrostatic actuation of the 7a membranes. The H layer is made of highly resistive Silicon to avoid short circuits. The membrane 7a forming the MEMS 7 microbalance is structured in the thickness of the D layer.

A silicon nitride Si$_3$N$_4$ layer of about one hundred nanometer thickness (named N) and then a polycrystalline silicon layer of micrometer thickness (named M) are deposited by LPCVD (Low Pressure Chemical Vapor Deposition) during steps 1 and 2.

A photosensitive resin is deposited on the top surface of the SOI and photolithography is then performed to define the structure of the membrane 7a and electrodes 14 in the resin in steps 3 and 4. At this step the difference between the patterns of the actuating electrodes 14 and the membrane is of the order of two micrometers.

The patterns are then transferred into the polysilicon layer by etching in an RIE (Reactive Ion etching) frame in step 5.

The SOI wafer is then placed in a high-temperature furnace (1100° C.) for several hours in order to oxidize the polysilicon in step 6.

As a result of this oxidation, a silicon oxide almost two microns thick was formed and the openings between the drive patterns and the membrane pattern were reduced to a few hundred nanometers.

During steps 8 and 9, a photolithography, followed by a DRIE etching ("Deep Reactive Ion etching") is performed to open the oxide layer where the electrical contacts will be deposited.

In a step 10, these patterns are then transferred by RIE etching into the polycrystalline Silicon and then the Silicon Nitride.

In addition, as schematized in step 7, the parameters of steps 1 to 6 as well as those of the D-Silicon DRIE etching have been previously optimized on test plates in order to obtain submicron gap openings.

During steps 11 and 12, a photolithography followed by an Aluminum deposition named "T", by sputtering and an acetone stripping allow to form the Aluminum contact pads for the electrical signal inputs and outputs.

In step 13, a photolithography is performed on the back side of the SOI to define opening areas under the membrane.

This pattern is transferred into the Silicon oxide of the back side by DRIE etching in a step 14.

The membrane and electrode patterns are transferred into the D-layer by DRIE etching in a step 15.

A final DRIE step on the back side transfers the opening area under the membrane into the H-layer.

The exposed silicon oxide is then dissolved by a hydrofluoric acid (HF) vapor etch in step 16. The membrane is now suspended.

The remaining polysilicon and nitride are finally cleaned by RIE etching in a step 17.

The invention claimed is:

1. A sensor for continuous in-situ analysis of an aerosol flow, allowing continuous measurement of a mass concentration, by size range of micron or submicron particles, suspended in the aerosol flow, comprising:
    an aeraulic sorter configured to carry out granulometry of the particles according to their size, by an impactor body with a cascade of at least two stages, with a flow pipe along a length of the impactor body, and at an inlet of the aeraulic sorter a particle sampling head allowing only PM10 particles to pass through,
    each stage consisting of at least:
        an axial nozzle through which the flow enters the stage, and
        lateral openings;
    a diameter and a number of lateral openings of the axial nozzle being chosen to allow control of an aerosol flow rate, and sorting of the particles according to their inertia, at each stage;
    at least one MEMS microbalance per stage, located at a distance from and facing the axial nozzle, with an active surface which is located in a particle impaction zone between lateral openings which allow the flow to pass through, to determine the mass less than or equal to one microgram of all the particles deposited on the particle impaction zone;
    each MEMS microbalance having at least one axial recess located under a membrane in order to suspend the membrane, the lateral openings being lateral to the axial recess and configured for the flow of the aerosol flow and located on either side of the axial recess,
    a processor connected to each MEMS microbalance to determine the mass of all the particles on the impaction zone;
    a system for cleaning each MEMS microbalance, at each stage, allowing evacuation of the particles from the MEMS microbalance, and
    means for flowing the aerosol flow,
    wherein the at least one MEMS microbalance has, as active surface, an oscillating silicon membrane with electrostatic actuation, said oscillating silicon membrane being:
    with a width comprised in a range between a hundred microns and ten millimeters,
    suspended from a plurality of silicon anchors to which the oscillating silicon membrane is fixed in tension,
    arranged between a plurality of electrodes suitable for electrostatic actuation,
    conformed to have a quality factor Q greater than 15000, and a mass m between 5 and 100 µg,
    conformed to have membrane oscillation frequencies between 1 and 20 MHz, and
    conformed to control adhesion and/or separation of particles on its surface by micro/nano structuring or physico-chemical functionalization.

2. The sensor according to claim 1, wherein the system for cleaning is realized by inlet channels and lateral outlet channels opening into the flow pipe, and means for circulating a cleaning fluid in these channels,
    the inlet lateral channels and outlet lateral channels fluidically communicating with the flow pipe and being arranged to circulate the cleaning fluid over the surface of the oscillating silicon membranes.

3. The sensor according to claim 1, wherein the oscillating silicon membrane is capable of deforming in its plane, in Lamé or extensional mode.

4. The sensor according to claim 1, wherein the means for flowing the aerosol flow are configured to allow a flow rate of one to ten L/min, and wherein the axial nozzles at each stage have an opening.

5. The sensor according to claim 1, wherein an alternating voltage combined with a direct voltage is applied to one or more actuating electrodes while the suspended oscillating silicon membrane is kept at zero electrostatic potential so as to deform the oscillating silicon membrane,
    the oscillating silicon membrane being electrostatically charged, a movement of which induces a charging movement and thus a current measured via contacts connected to the anchors of the oscillating silicon membrane or connected to an electrode not used for electrostatic actuation.

6. The sensor according to claim 1, wherein the oscillating silicon membrane has a surface area of one to 100 mm$^2$.

7. The sensor according to claim 1, wherein a surface of the oscillating silicon membrane is black silicon.

8. The sensor according to claim 7, wherein the surface of the oscillating silicon membrane is covered with a layer of polymer.

9. The sensor according to claim 1, wherein the impactor body has a stack of wafers of silicon or other micro/nano-structured materials, supported and fixed to each other.

10. The sensor according to claim 9, wherein each stage has four wafers:
- a first wafer with an axial nozzle;
- a second wafer with an axial recess and lateral flow openings; and
- two wafers so-called "spacers" arranged between the first and second wafers.

11. The sensor according to claim 10, wherein the system for cleaning each MEMS microbalance comprises input channels and lateral output channels located between one of the so-called "spacers" and the first wafer, the first wafer and the one "so-called" spacer each comprising silicon.

12. The sensor according to claim 1, wherein the diameter and the number of the lateral openings and of each axial nozzle are chosen to allow the control of the aerosol flow rate and the sorting of the PM10 particles, with a diameter of 300 nm to 10 μm, according to their inertia at each stage in order to measure a thoracic fraction of particles.

13. The sensor according to claim 1, wherein the system for cleaning each MEMS microbalance comprises an element for heating, located under each oscillating silicon membrane and/or in the impactor body at each stage.

14. The sensor according to claim 1, wherein the system for cleaning each MEMS microbalance comprises the oscillating silicon membrane designed to oscillate at a given frequency, allowing the separation of particles from the oscillating silicon membrane during cleaning.

15. The sensor according to claim 1, wherein the impactor body comprises means for opening/closing:
- axial openings;
- and/or axial nozzles;
- for controlling the flow rate of the aerosol flow circulating into the impactor body.

16. The sensor according to claim 1, wherein the axial nozzles and axial recesses are of decreasing size along the axis of the aerosol flow, so as to impact particles of decreasing size at each stage.

17. The sensor according to claim 1, wherein the diameter and the number of lateral openings allowing flow are determined to impact:
- particles between 10 micrometers and 2.5 micrometers or more, at a first stage; and
- particles between 2.5 micrometers and one micrometer at a second stage; and
- particles between one micrometer and 0.3 micrometers at a third stage, depending on a direction of the aerosol flow.

18. The sensor according to claim 1, wherein the flow pipe comprises silicon and is coated with a conductive metal.

19. The sensor according to claim 1, wherein the width of the oscillating silicon membrane is between 500 microns and ten millimeters.

20. The sensor according to claim 1, wherein each MEMS microbalance comprises electrostatic actuators, the distance between the oscillating silicon membrane and the electrostatic actuators being less than or equal to 1 micrometer.

21. The sensor according to claim 1, wherein the oscillating silicon membrane is a rectangular or square membrane.

22. The sensor according to claim 1, wherein the MEMS microbalance is configured to allow the mass measurement of particles between the attogram and the nanogram.

* * * * *